US009943453B2

(12) United States Patent
Naber et al.

(10) Patent No.: US 9,943,453 B2
(45) Date of Patent: Apr. 17, 2018

(54) OVERHEAD LOADING DEVICE

(71) Applicant: Stryker Corporation, Kalamazoo, MI (US)

(72) Inventors: Brandon David Naber, Portage, MI (US); Jason James Wroblewski, Kalamazoo, MI (US); Clifford Edwin Lambarth, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 721 days.

(21) Appl. No.: 14/998,026

(22) Filed: Jun. 20, 2014

(65) Prior Publication Data

US 2016/0338887 A1 Nov. 24, 2016

(51) Int. Cl.
*B60P 1/54* (2006.01)
*A61G 3/02* (2006.01)
*A61G 3/06* (2006.01)

(52) U.S. Cl.
CPC ............ *A61G 3/0272* (2013.01); *A61G 3/062* (2013.01)

(58) Field of Classification Search
CPC ..................................................... B60P 1/5422
See application file for complete search history.

(56) References Cited

U.S. PATENT DOCUMENTS 96,722 A * 11/1869 Payne ..................... A01K 1/06 119/403
3,572,513 A * 3/1971 Tantlinger ............ B60P 1/5442 212/180
3,912,093 A * 10/1975 Kruschke .............. B60P 1/5428 212/245
4,297,071 A * 10/1981 Dunbar ..................... B60P 1/36 212/74
4,831,967 A * 5/1989 Anderson ............. A01K 15/00 119/725
4,930,970 A * 6/1990 Sunderland ........... B60P 1/5442 212/227
5,062,760 A * 11/1991 Samaniego ............ B66C 17/00 212/322
5,253,605 A * 10/1993 Collins ................... B63B 21/66 114/258
5,615,785 A 4/1997 Kaner
5,660,143 A * 8/1997 Waring-Brown .... A01K 1/0236 119/400
5,743,702 A * 4/1998 Gunderson ........... B60P 1/5442 224/403
(Continued)

*Primary Examiner* — Jonathan Snelting
(74) *Attorney, Agent, or Firm* — Warner Norcross + Judd LLP

(57) ABSTRACT

An overhead loading device for use with an emergency vehicle having a patient compartment includes at least one beam configured for mounting at a ceiling of the patient compartment of the emergency vehicle, a carriage engaged for movement along the beam and configured to traverse at least a portion of the beam between an extended position and a retracted position, and a load carrying member operatively connected to the carriage and extending from the carriage. The load carrying member has a free end for attachment to a patient support. The carriage is configured to extend at least partially outside of the patient compartment when in the extended position and be positioned inside the patient compartment when in the retracted position.

19 Claims, 6 Drawing Sheets

(56) References Cited

U.S. PATENT DOCUMENTS

| | | | | |
|---|---|---|---|---|
| 5,908,279 | A * | 6/1999 | Mote ..................... B60P 1/5442 414/542 | |
| 7,031,883 | B1 * | 4/2006 | Lee ......................... B66C 1/101 702/187 | |
| 7,134,831 | B2 * | 11/2006 | Risser ................... B60P 1/5442 212/74 | |
| 7,377,398 | B2 * | 5/2008 | Lichinchi .............. B60P 1/5471 104/126 | |
| 7,478,855 | B2 | 1/2009 | Lambarth et al. | |
| 7,520,551 | B2 | 4/2009 | Lambarth et al. | |
| 7,540,547 | B2 | 6/2009 | Lambarth et al. | |
| 7,887,113 | B2 | 2/2011 | Lambarth et al. | |
| 8,051,513 | B2 | 11/2011 | Reed et al. | |
| 8,382,181 | B2 | 2/2013 | Bourgraf et al. | |
| 8,439,416 | B2 | 5/2013 | Lambarth et al. | |
| 8,534,980 | B2 | 9/2013 | Kurammoto | |
| 8,616,604 | B2 | 12/2013 | Bourgraf et al. | |
| 8,973,963 | B2 | 3/2015 | Lambarth et al. | |
| 9,456,939 | B2 | 10/2016 | Lambarth et al. | |
| 2009/0165207 | A1 | 7/2009 | Reed et al. | |

* cited by examiner

OVERHEAD LOADING DEVICE

TECHNICAL FIELD AND BACKGROUND OF THE INVENTION

The present invention relates to an overhead loading device for a cargo vehicle, such as an emergency vehicle for loading and unloading a patient support, and a method of loading and unloading a patient support into and out of a cargo vehicle.

For example, when loading an ambulance cot into an ambulance, an emergency medical service (EMS) attendant typically aligns the cot with the open rear doors of the ambulance and then pushes the cot toward the ambulance so that the head end of the cot is supported at the opening of the ambulance. Once supported at the head end of the cot, the EMS attendant, while supporting the foot end of the cot, raises the legs of the cot so that the cot can then be pushed into the ambulance. However, as noted, this typically requires the EMS personnel to support the foot end of the cot until most of the cot is loaded into the ambulance. In some cases, the head end of the cot may need to be lifted before insertion. With this scenario, the assistance of a second attendant is required. The removal process is much the same, except in reverse-namely, the cot is pulled from the opened rear doors of the ambulance, which requires the attendant to support the foot end of the cot while the cot is pulled out of the ambulance. As soon as the folded legs clear the back of the ambulance, the legs can then be lowered. Again, this requires the attendant to support the foot end of the cot while the cot is being pulled from the ambulance and until the legs can be lowered. This process is strenuous and could expose the EMS personnel to injury especially when dealing with heavy patients.

More recently, automated loading and unloading systems have been developed that support the cot while it is being loaded. These systems, however, occupy a sizeable portion of the floor space of the patient compartment.

SUMMARY OF THE INVENTION

Accordingly, the present invention provides an overhead loading device for a cargo vehicle, such as an emergency vehicle, to aid in the loading and unloading of a patient support that does not occupy any significant floor space of the emergency vehicle. The overhead loading device may load or unload a variety of patient supports, including cots, stair chairs, wheelchairs, stretchers, or the like.

In one embodiment of the invention, an overhead loading device is used with an emergency vehicle having a patient compartment. The overhead loading device includes at least one beam configured for mounting at a ceiling of the patient compartment of the emergency vehicle, a carriage engaged for movement along the beam and configured to traverse at least a portion of the beam between an extended position and a retracted position, and a load carrying member operatively connected to the carriage and extending from the carriage. The load carrying member has a free end for attachment to a patient support. The carriage is configured to extend at least partially outside of the patient compartment when in the extended position and be positioned inside the patient compartment when in the retracted position.

In another embodiment of the invention, an overhead loading device for an emergency vehicle having a patient compartment includes a winch and a load carrying member. The winch is configured to be mounted at a ceiling of the patient compartment, and the load carrying member is operatively connected to the winch. Further, the load carrying member has a free end for attachment to a patient support. The winch and load carrying member are configured to support the patient support, allowing the patient support to be pushed or pulled into the patient compartment.

In one aspect, the carriage is telescoping.

In another aspect, the overhead loading device includes a locking mechanism for selectively retaining the carriage in the extended and retracted positions, and/or in in various user-selected positions between the extended and retracted positions.

According to another aspect, the overhead loading device includes a winch mounted to the carriage, or the beam, or for mounting to the patient compartment. The winch is adapted to pull in, let out, or otherwise adjust the tension of the load carrying member. The winch may be a powered winch or a manually operated winch, and includes a mechanical release for operating the winch manually. Further, the winch may include a sensor for detecting the presence of an applied force on the load carrying member. The winch is operated at an operating speed which may be a function of the applied force as detected by the sensor. Additionally, the winch may include a sensor for determining the elevation of the free end of the load carrying member.

In further aspects, the overhead loading device includes a controller for controlling and coordinating the movement of the load carrying member, the winch, and/or the carriage. Optionally, the controller may be configured to be operated remotely.

In another aspect, the free end of the load carrying member includes one fastener selected from a group consisting of: a latch, a hook, a carabiner, a safety catch, and a clip.

In yet another aspect, the patient support is in the form of an emergency cot, a chair, a back board, or a stretcher.

In another aspect, the overhead loading device includes a stop for selectively preventing the patient support from being pushed or pulled into the patient compartment.

In another embodiment of the invention, a method of loading and unloading a patient support into an emergency vehicle includes moving a patient support adjacent a patient compartment, then moving a carriage with a load carrying member relative to a beam affixed at the ceiling of the patient compartment. The carriage moves from a retracted position where the carriage is disposed within the patient compartment to an extended position where the carriage extends at least partially outside of the patient compartment. The method continues by extending the load carrying member relative to the carriage, coupling the load carrying member to the patient support, collapsing a base frame of the patient support, and moving the carriage relative to the beam. The carriage moves from the extended position to the retracted position, pulling the patient support into the patient compartment.

In another aspect, the method step of pulling the patient support into the patient compartment includes bearing the weight of the head end of the patient support and rolling the wheels of the patient support. The method step of coupling the load carrying member to the patient support optionally includes bearing the weight of the foot end of the patient support when the base frame has been collapsed.

In another aspect, the head end of the patient support includes wheels configured to bear the weight when the base frame has been collapsed. The wheels configured to roll along a floor of the patient compartment when the patient support is moved into or out of the patient compartment.

Accordingly, an overhead loading device is described that facilitates the loading and unloading of a patient support to and from an emergency vehicle. These and other advantages will become more apparent to one of ordinary skill in the art upon reading the following specification and inspecting the accompanying drawings, which follow.

Further, while the overhead lifting device is described for use with an emergency vehicle and a patient support, the overhead lifting device may be used with any number of vehicles that utilize loading and unloading of equipment. For example, the overhead loading device could be used with a utility truck, such as a package delivery truck, for loading and unloading large packages. In another example, the overhead loading device could be mounted at a ceiling of a semi-truck trailer, for loading and unloading items into and out of the trailer.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE EMBODIMENTS

Figure 1:
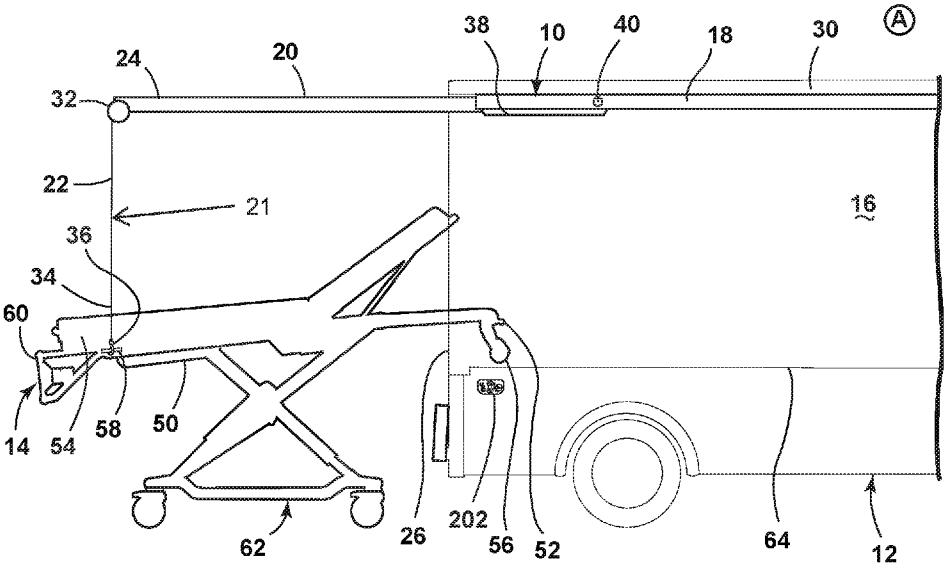
FIG. 1 is a side elevation view of a patient compartment of an emergency vehicle and a patient support with an overhead loading device according to one embodiment, illustrating the overhead loading device in an extended position.

Referring to FIGS. 1-4, the numeral 10 generally designates an overhead loading device for an emergency vehicle 12 for loading and unloading a patient support 14. The overhead loading device 10 is configured for mounting in a patient compartment 16 of the emergency vehicle 12 and includes at least one beam in the form of a guide track 18, a carriage in the form of a boom 20, and a load carrying member 22. As will be more fully described below, the overhead loading device 10 is configured to assist in the loading or unloading of the patient support 14 into or out of the emergency vehicle 12 by providing vertical support while the patient support 14 is loaded into or out of the patient compartment 16. Once the patient support 14 has been engaged and lifted by the overhead loading device 10, the collapsible legs or base of the patient support 14 can be folded up and the patient support 14 loaded into the emergency vehicle 12.

Referring again to FIG. 1, when the overhead loading device 10 is in an extended position A where a distal end 24 of the elongated boom 20, extends out of an access opening 26 of the patient compartment 16 of the emergency vehicle 12. The overhead loading device 10 includes at least one elongated guide track 18, which may consist of a pair of elongate and parallel guide rails, or other suitable elongated mounting structure. The guide track 18 is configured to be mounted at a ceiling 30 of the patient compartment 16 of the emergency vehicle 12. In the illustrated example, the guide track 18 is shown mounted to the ceiling 30; however, it should be understood that the guide track may alternatively be mounted to a roof of the emergency vehicle 12, or may be integrally formed in the ceiling.

Figure 4:
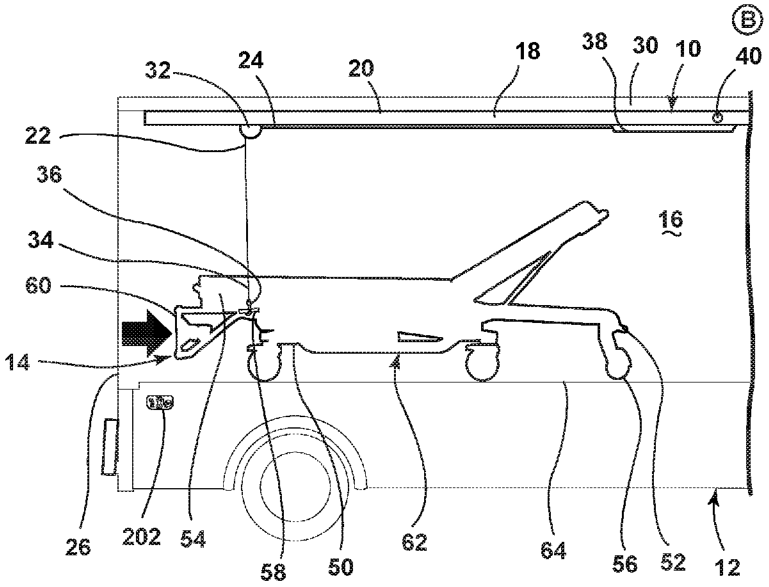
FIG. 4 is a side view of the overhead loading device and patient support, illustrating the overhead loading device in a retracted position and the patient support loaded into the patient compartment.

The boom 20 is engaged for movement along the guide track 18 and is configured to traverse at least a portion of the guide track 18 between the extended position A and a retracted position B, shown in FIG. 4. Further, the boom 20 may be telescopingly mounted to the guide track 18. The overhead loading device 10 may include a drive mechanism or motor, as will be more fully described below, for powering the movement of the boom 20 along the length of the guide track 18. Alternately, the boom 20 may be configured for manual movement along the guide track 18.

The overhead loading device 10 also includes a load carrying member 21. For example, load carrying member 21 may be formed by a cable, or a belt, or a rope, or a chain. For ease of reference, load carrying member 21 will hereinafter be described in reference to the cable version and referred to as a lift cable 22. The lift cable 22 is operatively connected to the boom 20. Further, the overhead loading device 10 includes a winch 32 mounted to the boom 20 and which is adapted to pull in, let out, or otherwise adjust the tension on the lift cable 22. In the illustrated embodiment, the winch 32 is shown mounted to the distal end of the boom 20. However, the winch 32 may be mounted in a number of locations, including on the guide track 18 or within the patient compartment 16. Additionally, the winch 32 may be a powered winch or a manually-operated winch.

The lift cable 22 has a free end 34 for selectively attaching to the patient support 14. For example, the free end 34 may include a fastener 36, such as a latch, a hook, a carabiner, a safety catch, a clip, or any other suitable fastener.

In the exemplary embodiment, the patient support 14 is illustrated as an ambulance cot. However, it should be easily understood that the patient support could be in the form of an emergency cot, a wheelchair, a back board, a stretcher, or any other medical patient support apparatus. Exemplary constructions of the cot 14 are disclosed in detail in U.S. Pat. Nos. 5,537,700; 6,125,485; and 7,398,571 which are incorporated herein by reference in their entireties. The cot 14 includes a patient support deck frame 50, which has a head end 52 and a foot end 54. The head end 52 includes one or more rollers 56 or wheels rotatably mounted on an axis of rotation that extends perpendicular to a longitudinal axis of the cot 14. The foot end 54 includes one or more foot end linkage bars 58, and may also include hand grips 60. As noted above, the cot 14 also includes a collapsible wheeled base 62 that supports the deck frame 50.

To load the cot 14 into the emergency vehicle 12, the cot 14 is moved by the attendant via its rolling base 62 into alignment with the access opening 26 (either rear or side access opening) of the patient compartment 16. Once the cot 14 is adjacent the opening 26, the cot 14 is rolled forward (toward the emergency vehicle 12) so that the rollers 56 at the head end 52 of the frame 50 are moved into engagement and rest on the floor 64 of the patient compartment 16. The overhead loading device 10 is deployed by moving the boom 20 relative to the guide track 18. The boom 20 is moved from the retracted position B to the extended position A in which the boom 20 and the winch 32 extend at least partially outside of the patient compartment 16 through the access opening 26. The lift cable 22 may then be lowered down from the boom 20 and coupled to the cot 14 by attaching the fastener 36 to the cot 14, for example to the linkage bar 58 at the foot end 54 of the deck frame 50.

Figure 2:
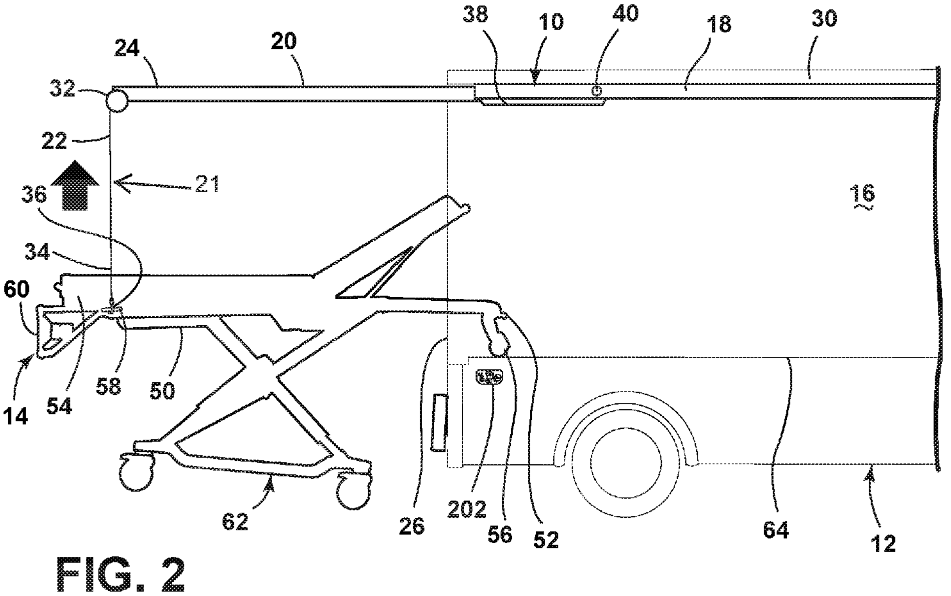
FIG. 2 is a view similar to FIG. 1, with the overhead loading device lifting the patient support.
Figure 3:
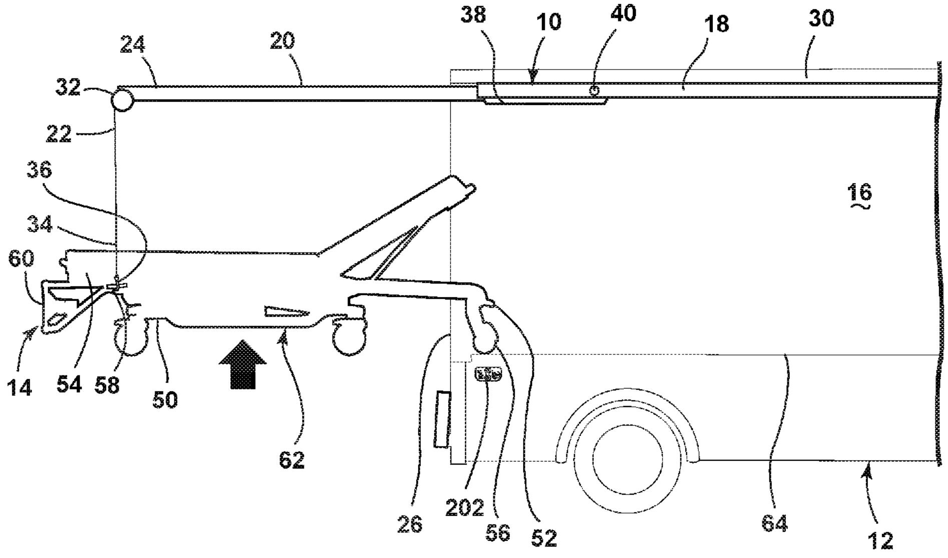
FIG. 3 is a side view of the patient support being moved into the patient compartment by the overhead loading device.

With the cot 14 coupled to the boom 20, the lift cable 22 may be drawn in or up by the winch 32 a slight amount until the lift cable 22 at least partially supports the weight of the food end 54 of the cot 14. The lift cable 22 may further be drawn in or up to lift the foot end 54 of the cot 14 to be substantially level with the head end 52 of the cot 14, as shown in FIG. 2. At this point, the attendant may collapse the base 62, as shown in FIG. 3, using cot-based controls (such as those described in the above referenced patent). Accordingly, the weight of the cot 14 is supported at the head end 52 by the rollers 56, and at the foot end 54 by the linkage bar 58. The boom 20 is then retracted along the guide track 18 while the rollers 56 roll along the floor 64 of the patient compartment 16, thereby pulling the cot 14 into the patient compartment 16 and to the retracted position B shown in FIG. 4.

Figure 1A:
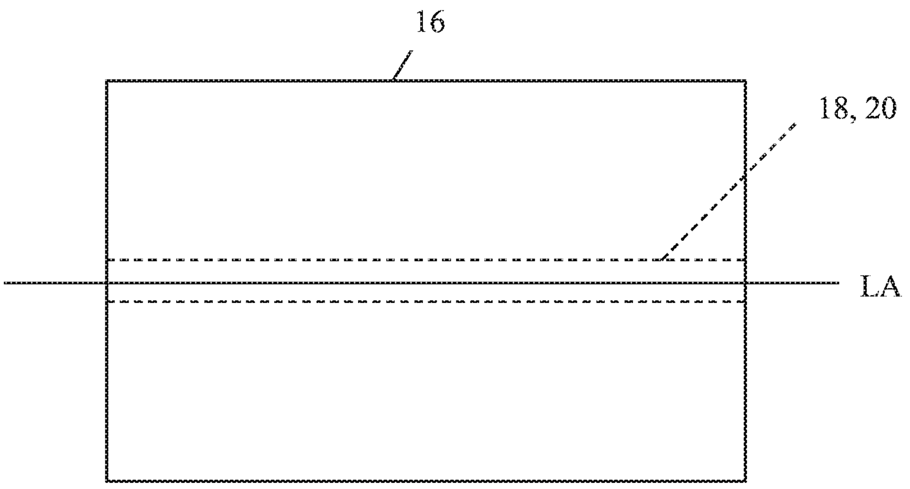
FIG. 1A is a schematic drawing of a ceiling of the emergency vehicle of FIG. 1, illustrating a centered overhead loading device.

The overhead loading device 10 may be centered on the ceiling 30 or may be laterally offset from the central longitudinal axis LA of the ceiling 30. Referring to FIG. 1A, in one embodiment, the guide track 18 and boom 20 are mounted along the central longitudinal axis LA of the ceiling 30; in other words, centered on the width of the ceiling. In this embodiment, the lift cable 22 is bifurcated at its free end 34 and includes two fasteners 36.

During loading and unloading, the cot 14 is centered under the extended boom 20, and the two fasteners 36 on the free ends 34 of the lift cable 22 are attached to linkage bars 58 located at the foot end 54 and positioned on opposing sides of the deck frame 50.

Figure 1B:
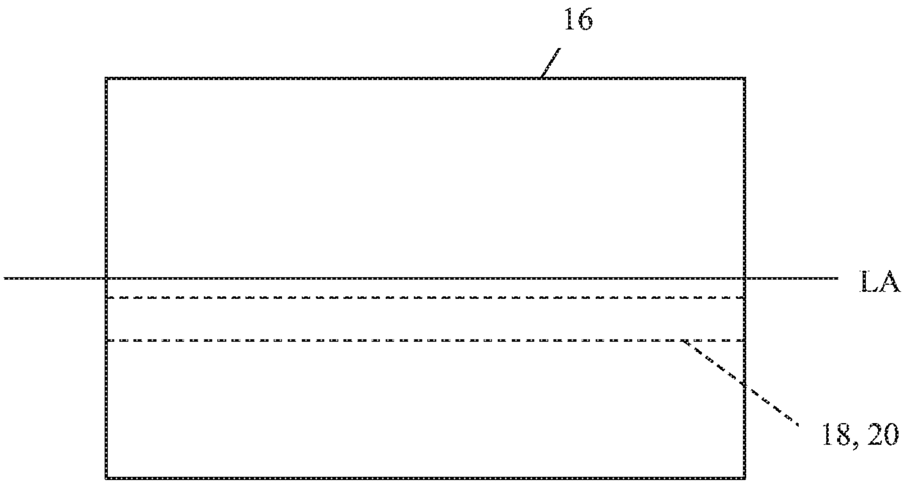
FIG. 1B is a schematic drawing of a ceiling of the emergency vehicle of FIG. 1, illustrating an offset overhead loading device.

Referring to FIG. 1B, in an alternate embodiment, the guide track 18 and boom 20 are laterally offset from the central longitudinal axis LA of the ceiling 30, and the lift cable 22 includes only one free end 34 and fastener 36. During loading and unloading, the cot 14 is centered under the central longitudinal axis LA of the ceiling 30, and the fastener 36 on the free end 34 of the lift cable 22 is attached to the corresponding linkage bar 58 located at the foot end 54 of the deck frame 50.

Figure 5:
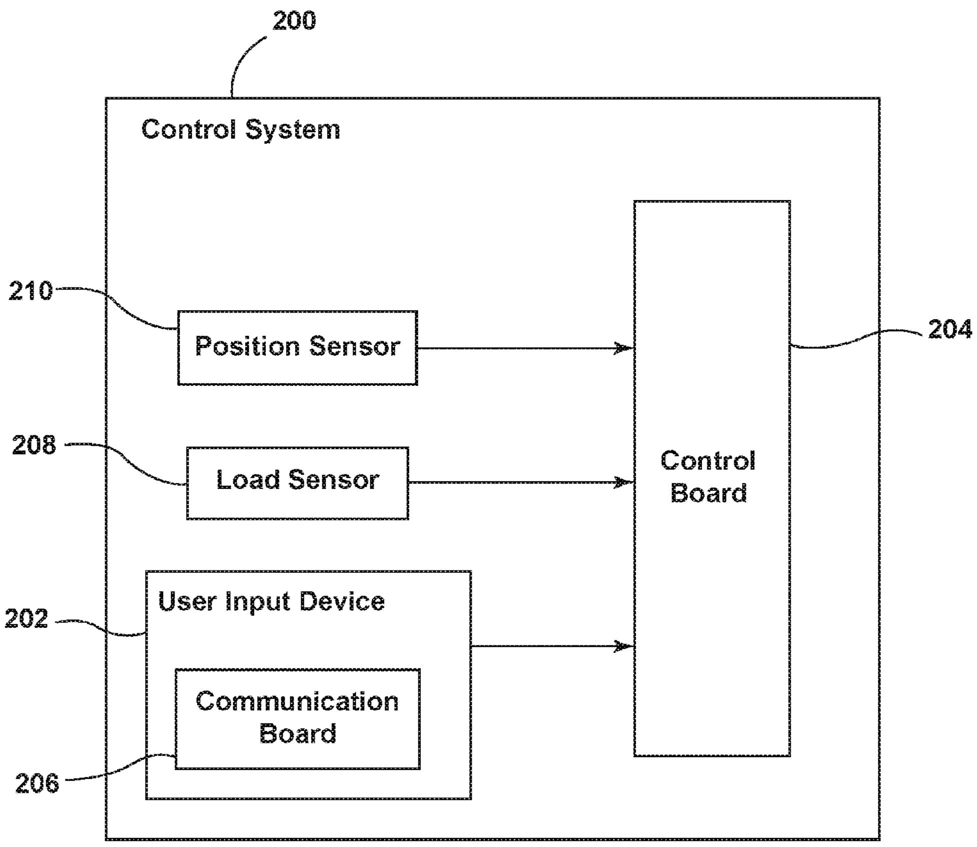
FIG. 5 is a schematic drawing of a control system for the overhead loading device of the present invention.

Referring now to FIG. 5 and according to another embodiment, the overhead loading device 10 includes a control system 200 for controlling and coordinating the actuation and movement of the boom 20 and/or optionally of the lift cable 22 via a drive mechanism 38. As noted above, in the case where the winch is a powered winch, the control system 200 can also control actuation of the winch 32. The control system 200 includes a user input device 202 provided at the emergency vehicle 12. The user input device 202 includes user actuatable buttons or switches to allow a user to input signals for extending or retracting the boom 20 and for winding or unwinding the winch 32. The control system 200 includes a control board 204 in communication with the user input device 202. The user input device 202 may also include a communication board 206 with a wireless transmitter and/or receiver, such as a RF device, an inductive device, an acoustic device, an optical device, or an infrared device, so that the control system 200 can be controlled remotely. Additionally, a communication device may be located on the patient support to allow a user who is handling the patient support to control the patient support and also control the loading device. Further, in each case the communication may be one-way or two-way communication. For an example of a suitable communication system that may be used to provide communication, including communication between a patient support the loading device, reference is made to U.S. Pat. No. 8,439,416, which is incorporated by reference in its entirety herein and which is commonly owned by Stryker Corporation of Kalamazoo, Mich.

The control board 204 is in communication with a load sensor 208, such as a load cell, including an analog strain gauge, which may be mounted at the winch 32, for detecting whether a load is applied to the lift cable 22 or boom 20. The control board 204 may also be in communication with a position sensor 210, which may be mounted on the winch 32 or the free end 34 of the lift cable 22, for determining the elevation of the free end 34.

Drive mechanism 38 may be configured to move the boom 20 along the guide track 18 at a first operating speed when the boom 20 is deployed, but not loaded by an applied force as detected by the load sensor 208, for example when not lifting a cot while moving to the extended position A. The drive mechanism 38 may be configured to deploy the boom 20 at another, slower speed or speeds when the boom 20 is loaded with an applied load, for example when engaged with and lifting a cot while moving to the retracted position B. The slower speed at which the boom 20 is moved may be variable or may have two or more discrete speeds for specific ranges of motion. Alternately, the drive mechanism 38 may be configured to move the boom 20 at a slower speed only when loaded with a weight that exceeds the weight of a cot, for example, when the cot is supporting a patient. Optionally, the boom 20 could be moved at one speed when fully unloaded, another slower speed when loaded with a cot, and yet another even slower speed or speeds when the boom 20 is moving a cot that is supporting a patient. Accordingly, the memory of control board 204 may have stored therein a threshold load, such as zero or the weight of a cot, for determining the operating speed.

The powered winch 32 can be controlled in a similar manner as the drive mechanism 38. The winch 32 may be configured to let out the lift cable 22 at a first operating speed when not loaded by an applied force as detected by the load sensor 208, for example when not lifting a cot in the extended position A. The winch 32 may be configured to wind up the lift cable 22 at another, slower speed or speeds when loaded with an applied load, for example when engaged with and lifting a cot. The slower speed at which the winch 32 is rotated may be variable or may have two or more discrete speeds. Alternately, the winch 32 may be configured to wind up the lift cable 22 at a slower speed only when loaded with a weight that exceeds the weight of a cot, for example, when a cot is supporting a patient. Optionally, the winch 32 could be rotated at one speed when fully unloaded, another slower speed when loaded with a cot, and yet another even slower speed or speeds when loaded with a cot that is supporting a patient. Furthermore, the winch 32 may include a mechanical release for operating the winch manually.

The overhead loading device 10 optionally includes a locking mechanism 40 configured to selectively retain the boom 20 in the extended and retracted positions A and B, as well as in other various user-selected positions between the extended and retracted positions A and B. The locking mechanism 40 is mounted on one of the boom 20 and guide track 18 for releasably retaining the boom 20 in a given position. The locking mechanism 40 may be in the form of a spring loaded pin, a spring biased pawl and bracket, or any other suitable means for locking the boom to the guide track. Further, the locking mechanism may be manually or automatically engaged, and may include an electrical actuator, such as a solenoid, so that is can be controlled by the control system 200.

The locking mechanism 40 is optionally normally locked to the guide track 18. When it is desired to extend or retract the boom 20, the locking mechanism 40 is released so that the boom 20 can be moved along the guide track 18. Once the boom 20 has reached the desired position, the locking mechanism 40 will once again engage the guide track 18, securing the boom 20 in place.

Although not shown in the drawings, it is contemplated that the overhead loading device 10 may include interior vehicle lighting, medical accessories such as those commonly found in an emergency vehicle, and a mount for mounting medical accessories or the like.

Figure 6:
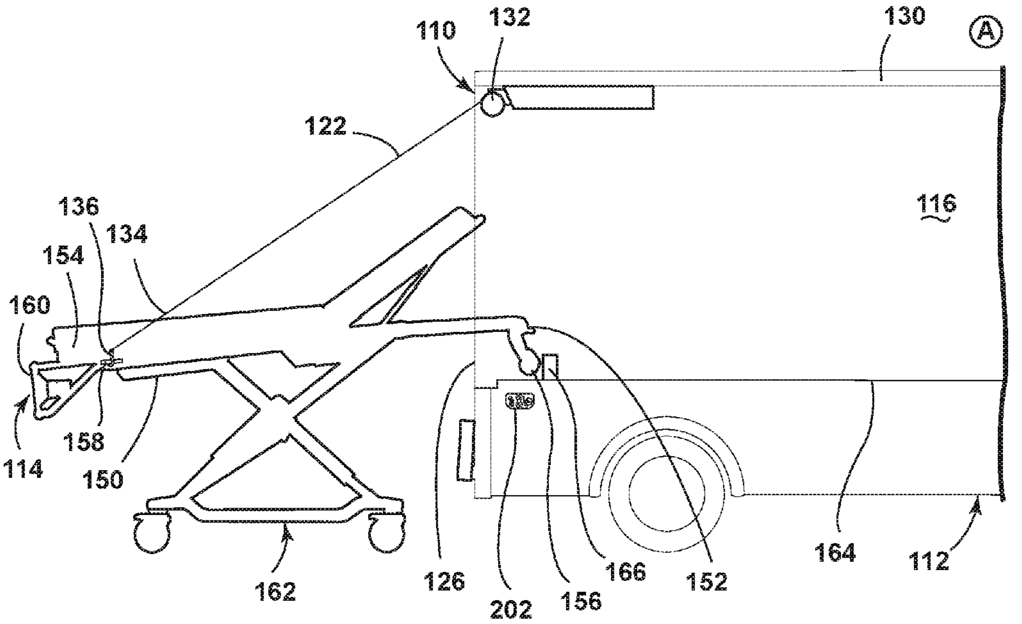
FIG. 6 is a side elevation view of a patient compartment of an emergency vehicle and a patient support with an overhead loading device according to another embodiment, illustrating loading the patient support with the overhead loading device.
Figure 7:
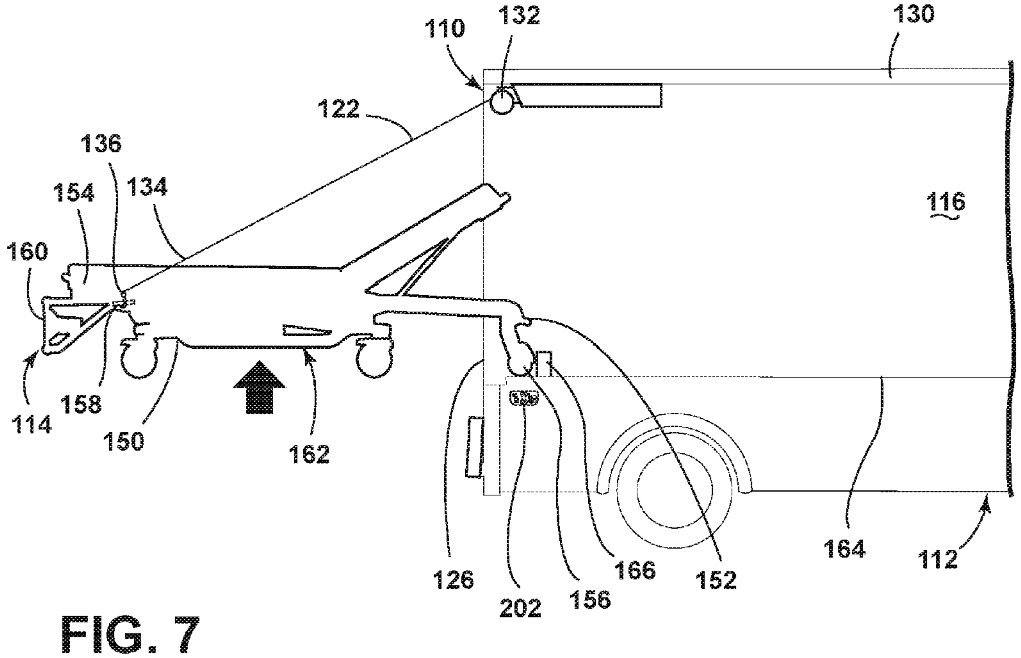
FIG. 7 is a view similar to FIG. 1, with the overhead loading device lifting the patient support and moving the patient support into the patient compartment.
Figure 8:
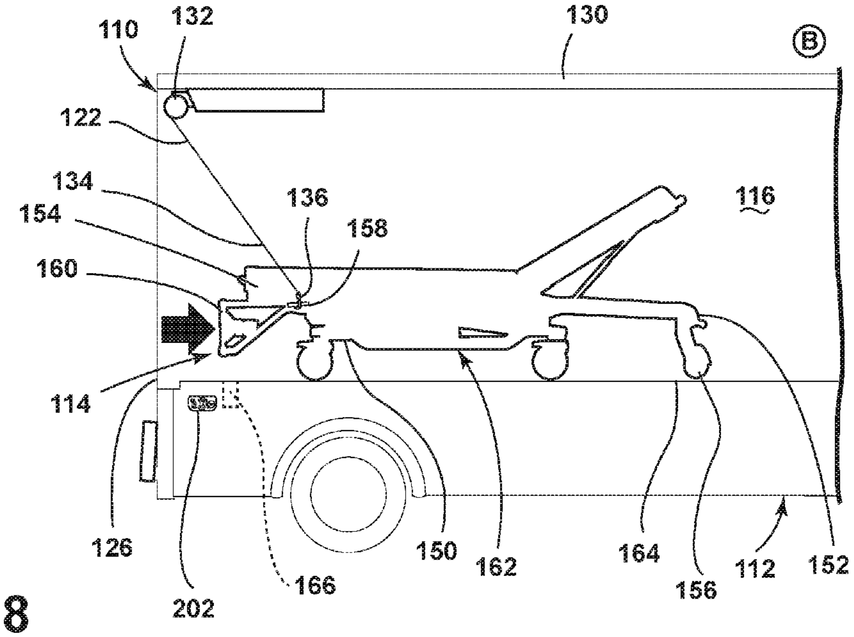
FIG. 8 is a side view of the overhead loading device and patient support, illustrating the overhead loading device and patient support loaded into the patient compartment.

Referring to FIGS. 6-8, the number 110 designates another embodiment of the overhead lift device. Overhead lift device 110 similarly includes a winch 132 and a load carrying member 122. For further details of the patient support or cot 114 and the emergency vehicle 112 reference is made to the embodiments described above.

In the illustrated embodiment, the winch 132 is mounted at a ceiling 130 of the patient compartment 116 and the load carrying member, defined by a cable, or a belt, or a rope, or a chain and referred to herein as lift cable 122, is operatively connected to the winch 132. As in the previous embodiments, the lift cable 122 includes a free end 134 having an optional fastener 136 for attachment to the cot 114. Further, the lift cable 122 maybe bifurcated at its free end 134 and may include two fasteners 136. The emergency vehicle 112 includes a stop 166 for selectively preventing the cot 114 from being pushed or pulled into the patient compartment 116 from the rear opening 126 until desired. The stop 166 is a physical structure configured to prevent the forward movement of the cot 114. In the illustrated example, the stop 166 is a barrier that can be selectively raised up out of the floor 164 of the emergency vehicle 112. Alternately, the stop may be pivotally mounted to either the floor or a sidewall of the patient compartment and pivoted into position when needed. Alternately, other mechanisms of preventing the forward movement of the cot 114 are also contemplated; for example, a wheel lock, a bar, or a block.

To load the cot 114 into the emergency vehicle 112, the cot 114 is moved into the loading position, as described above and shown in FIG. 6. The stop 166 is raised and the cot 114 is rolled forward so that the rollers 156 at the head end 152 of the frame 150 are moved into engagement and rest on the floor 164 of the patient compartment 116. With the stop 166 raised, the cot 114 cannot inadvertently roll forward into the patient compartment 116. The overhead loading device 110 is deployed, activating the winch 132 to unwind the lift cable 122, thereby lowering the free end 134 and fasteners 136. The attendant may then couple the lift cable 122 to the cot 114 by attaching the fasteners 136 to the linkage bar 158 at the foot end 154 of the deck frame 150.

With the cot 114 coupled to the lift cable 122 and the restricted by the stop 166, the lift cable 122 may be drawn in or up by the winch 132 a slight amount until the lift cable 122 at least partially supports the weight of the food end 154 of the cot 114. The lift cable 122 may further be drawn in or up to lift the foot end 154 of the cot 114 to be substantially level with the head end 152 of the cot 114, as shown in FIG. 7. At this point, the attendant may collapse the wheeled base 162. When the attendant is ready to move the cot 114 into the patient compartment 116, the stop 166 may be lowered, freeing the rollers 152 for forward movement. The attendant may then push on the foot end 154 (which may also include hand grips 160) of the supported cot 114 to facilitate movement of the cot 114 into the patient compartment 116. As the cot 114 moves forward, the winch 132 is activated to draw the lift cable 122 in and the rollers 156 roll along the floor 164 of the patient compartment 116. FIG. 8 illustrates the overhead lift device 110 and cot 114 in the loaded position.

It should be understood that while the overhead lifting device is described above as for use with an emergency vehicle and a patient support, the overhead lifting device could be used with any number of vehicles that utilize loading and unloading of equipment. For example, the overhead loading device could be used with a utility truck, such as a package delivery truck, for loading and unloading large packages. In another example, the overhead loading device could be mounted at a ceiling of a semi-truck trailer, for loading and unloading items into and out of the trailer.

While several forms of the overhead lifting device have been shown and described, the above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert but which can be used independently and/or combined with other features.

The overhead lifting device is not limited to only those embodiments that include all of these features or that provide all of the stated benefits, except to the extent otherwise expressly set forth in the issued claims. For example, any reference to claim elements in the singular, for example, using the articles "a," "an," "the" or "said," is not to be construed as limiting the element to the singular. Additionally, directional terms used in the specification, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

We claim:

1. An overhead loading system to assist in supporting and loading of a wheeled patient support into an emergency vehicle, the emergency vehicle having a patient compartment, and the overhead loading system comprising:

at least one beam configured for mounting at a ceiling of the patient compartment of the emergency vehicle;

a carriage engaged for movement along the beam and configured to traverse at least a portion of the beam between an extended position and a retracted position;

a wheeled patient support, the wheeled patient support having a frame, a longitudinal axis, a center of gravity, and at least one wheel; and a load carrying member operatively connected to the carriage and extending from the carriage, the load carrying member having a free end for attachment to the wheeled patient support offset along said longitudinal axis from the center of gravity of the patient support, wherein the carriage is configured to extend at least partially outside of the patient compartment when in the extended position where the load carrying member is operable to attach to the patient support offset along said longitudinal axis from the center of gravity of the patient support to assist in supporting and loading of the patient support and wherein the carriage is configured to be disposed inside the patient compartment when in the retracted position.

2. The overhead loading system of claim 1, wherein the carriage is telescoping.

3. The overhead loading system of claim 1, further comprising a locking mechanism configured to selectively retain the carriage in the extended and retracted positions.

4. The overhead loading system of claim 3, wherein the locking mechanism is adapted to retain the carriage in various user-selected positions between the extended and retracted positions.

5. The overhead loading system of claim 1, wherein the load carrying member is defined by a cable, or a belt, or a rope, or a chain.

6. The overhead loading system of claim 1, including a winch mounted to the carriage, the beam, or the patient compartment and adapted to pull in, let out, or adjust a tension of the load carrying member.

7. The overhead loading system of claim 6, wherein the winch is a powered winch.

8. The overhead loading system of claim 7, wherein the winch includes a mechanical release for operating the winch manually.

9. The overhead loading system of claim 6, wherein the winch includes a sensor for detecting a presence of an applied force on the load carrying member.

10. The overhead loading system of claim 9, wherein the winch includes an operating speed, the operating speed of the winch being a function of the applied force detected by the sensor.

11. The overhead loading system of claim 6, wherein the winch includes a sensor for determining an elevation of the free end of the load carrying member.

12. The overhead loading system of claim 1, including a controller for controlling movement of the load carrying member, the winch, or the carriage.

13. The overhead loading system of claim 12, wherein the controller coordinates the movement of the carriage and the load carrying member.

14. The overhead loading system of claim 12, wherein the controller is configured to be operated remotely.

15. The overhead loading system of claim 1, wherein the beam includes lighting, medical accessories, and/or a mount for mounting medical accessories.

16. The overhead loading system of claim 1, wherein the free end of the load carrying member includes one fastener selected from a group consisting of a latch, a hook, a carabiner, a safety catch, and a clip.

17. The overhead loading system of claim 1, in combination with the emergency vehicle, the beam being mounted at the ceiling of the patient compartment.

18. The overhead loading system of claim 1, wherein the patient support comprises an emergency cot or a chair.

19. An overhead loading system to assist in supporting and loading of a wheeled patient support into an emergency vehicle, the emergency vehicle having a patient compartment, and the overhead loading system comprising:

a winch configured to mount at a ceiling of the patient compartment of the emergency vehicle;

a wheeled patient support, the wheeled patient support having frame, a longitudinal axis, a center of gravity, and at least one wheel; and a load carrying member operatively connected to the winch and having a free end for attachment to the wheeled patient support offset along said longitudinal axis from the center of gravity of the patient support, wherein the winch and the load carrying member are configured to assist in supporting the patient support while allowing the wheeled patient support to be pushed or pulled into the patient compartment.

* * * * *